June 18, 1957 P. LEYSTRA 2,795,980
COPPER FITTING REAMER
Filed Oct. 25, 1954
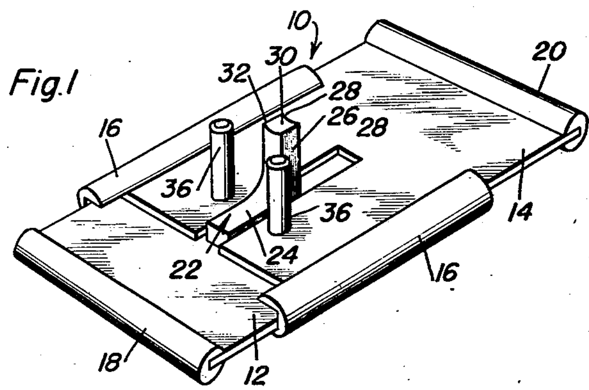
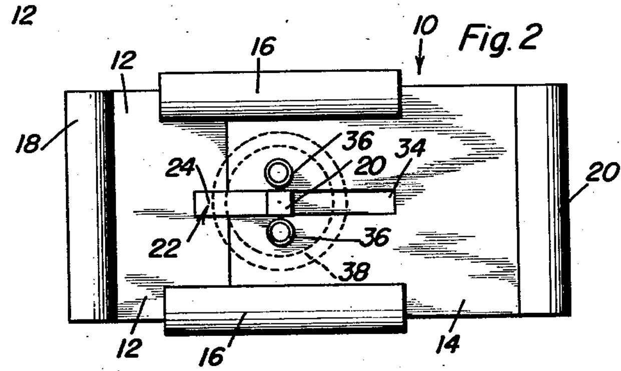
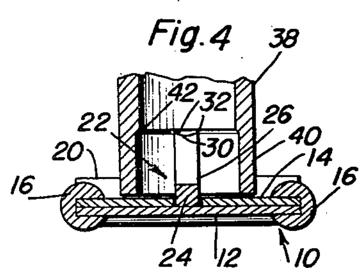
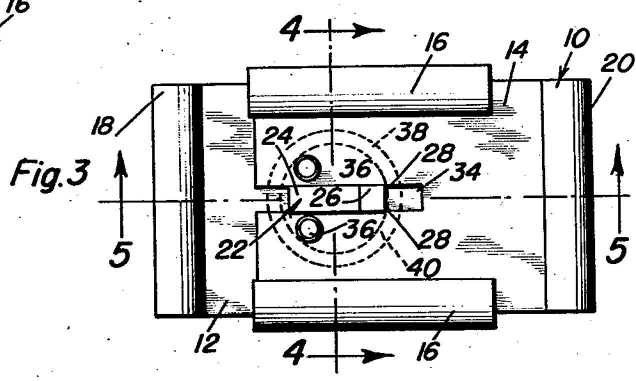
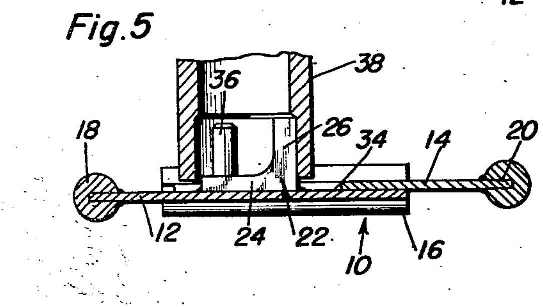
Peter Leystra
INVENTOR.
BY Clarence A. O'Brien and Harvey B. Jacobson
Attorneys United States Patent Office 2,795,980

Patented June 18, 1957

2,795,980

COPPER FITTING REAMER

Peter Leystra, Fair Lawn, N. J.

Application October 25, 1954, Serial No. 464,261

2 Claims. (Cl. 77—75)

This invention relates to new and useful improvements in tools, and more specifically to a reamer for cleaning copper tubing fittings.

In order that a proper joint may be made between an end of a length of copper tubing and a fitting therefor, it is necessary that both the cooper tubing and the fitting be cleaned so that the solder utilized in making the joint will adhere or bond thereto. While it is relatively easy to take a piece of sandpaper or the like and clean the exterior surface of the copper tubing, due to the relatively small size of the opening in the fitting, it is extremely difficult to properly clean the matching surfaces thereof.

It is therefore the primary object of this invention to provide a reaming tool which is so constructed whereby it may be conveniently positioned in a copper tubing fitting and clean the portions thereof to which a copper tubing section is to be bonded.

Another object of this invention is to provide a copper tubing fitting reamer which is so constructed whereby it may be readily adjusted to the desired size of copper tubing fitting.

Another object of this invention is to provide a copper tubing fitting reamer which is of such a construction whereby it may be readily gripped in one's hand and rotated with respect to a fitting so as to simultaneously clean both the inner wall surface thereof and an abutting shoulder for an end of a section of copper tubing.

A further object of this invention is to provide an improved copper tubing fitting reamer which is of extremely simple construction and includes sliding parts whereby a cutting tool thereof may be readily moved into engagement with the surfaces of the fitting in order to properly ream or clean them.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the copper tubing fitting reamer and shows the general details thereof;

Figure 2 is a top plan view of the reamer of Figure 1 and shows the relationship of guide pins and the cutting tool thereof in an initial fitting receiving position, the fitting being shown by dotted lines;

Figure 3 is a top plan view similar to Figure 2 and shows the parts of the reamer shifted so as to move the cutting tool thereof into engagement with the inner wall of the fitting, the fitting being shown in dotted lines;

Figure 4 is a vertical sectional view taken substantially upon the plane indicated by the section line 4—4 of Figure 3 and shows the relationship of the tool with respect to a copper fitting; and Figure 5 is a longitudinal vertical sectional view taken along the section line 5—5 of Figure 3 and further shows the relationship of the reamer with respect to a fitting.

Referring now to the drawings in detail, it will be seen that the copper tubing fitting reamer is referred to in general by the reference numeral 10. The reamer 10 includes a first plate 12 and a second plate 14 slidably connected together. The plate 12 underlies the plate 14 and has secured to opposite side edges thereof guide members 16. The guide members 16 are of a size to have guidingly received therein side edges of the plate 14.

In order that the plates 12 and 14 may be conveniently gripped for utilizing the reamer 10, there is provided on the plate 12 a gripping member 18 and on the plate 14 a gripping member 20. The gripping members 18 and 20 are formed of circular bar stock slotted to fit over the ends of their respective plates 12 and 14.

Carried by the plate 12 is a generally L-shaped cutting tool 22. The cutting tool 22 includes a horizontal leg 24 which is securable to the plate 12 and a vertical leg 26. The corners of the vertical legs 26 are in the form of cutting edges 28. The upper surface of the leg 26 is hollow ground, as at 30, to provide upper cutting edges 32.

The plate 14 is provided with a longitudinal slot 34 to provide clearance for the cutting tool 22. Carried by the plate 14 and projecting upwardly in parallel relation to the leg 28 are guide pins 36, the guide pins 36 being disposed on opposite sides of the slot 34.

Referring now to Figures 4 and 5 in particular, it will be seen that there is illustrated a copper tubing fitting 38. The fitting 38 is of a conventional type and includes an inner wall surface 40 which must be cleaned in order to provide a proper bond with a section of copper tubing. The inner wall 40 terminates at its inner edge in a shoulder 42 which must also be cleaned.

When it is desired to clean the inner wall surface 40 ing the shoulder 42 of a copper tubing fitting, such as the fitting 38, the guide pins 36 are aligned with the vertical leg 26 of the cutting tool 22, as is best illustrated in Figures 2. Then, the desired end of a copper tubing fitting 38 is positioned over the guide pins 36 and the vertical leg 26. Next, the reamer 10 is gripped in one's hand and the plates 12 and 14 further slid into overlying relation by squeezing together the grip portions 18 and 20. This moves the guide pins 36 into engagement with the inner wall surface 40 and the cutting edges 28 into engagement with the same inner wall surface 40, as is best illustrated in Figure 3. This having been accomplished, the fitting 38 is turned relative to the reamer 10 with the result that the cutting edge 28 which is in advance, the particular cutting edge depending upon the direction of rotation of the reamer 10, will cuttingly engage the surface 40 so as to clean it.

In the cutting or cleaning operation, the fitting 38 is urged toward the reamer 10 with the result that the cutting edge 32 on the upper end of the leg 26 engages the shoulder 42 to also cut or clean it.

The cutting tool 22 has been illustrated with the horizontal leg 24 thereof bonded to the plate 12 by welding or the like. However, while this is the simplest form of the invention, it is to be understood that the cutting tool 22 may be made replaceable, if desired, and secured to the plate 22 by a suitable releasable connection.

Although there has not been illustrated in the drawings means to accomplish the positioning of the pins 36 in the cutting tool 22 as illustrated in Figure 2, it is to be understood that suitable means may be provided to retain the plates 12 and 14 so that the pins 36 are transversely aligned with the vertical leg 26 of the cutting tool 22. This may be accomplished by incorporating a coil spring in the plate 12 on opposite sides of the recess 34 and placing suitable fasteners on the plate 14 for engaging ends of such springs to urge the plates 12 and 14 into the positions illustrated in Figure 2.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A scraper for copper tubing fittings comprising first and second plates disposed in overlying freely sliding relation, guide means on side edges of one of said plates engaging the other of said plates to limit said sliding to a longitudinal direction, upstanding guide pins on one of said plates, an upstanding cutter on the other of said plates, said plates having remote ends, gripping members on said remote ends, said guide pins and said cutter normally being generally transversely aligned to facilitate insertion in a fitting, said gripping members facilitating gripping of said plates and the automatic movement of said plates to further overlapping relation to move said cutter and said guide pins apart and into a fitting scraping position.

2. A scraper for copper tubing fittings comprising first and second plates disposed in overlying freely sliding relation, guide means on side edges of one of said plates engaging the other of said plates to limit said sliding to a longitudinal direction, upstanding guide pins on one of said plates, an upstanding cutter on the other of said plates, said plates having remote ends, gripping members on said remote ends, said guide pins and said cutter normally being generally transversely aligned to facilitate insertion in a fitting, said gripping members facilitating gripping of said plates and the automatic movement of said plates to further overlapping relation to move said cutter and said guide pins apart and into a fitting scraping position, said guide pins being transversely spaced, said cutter being disposed along a longitudinal line passing between said guide pins.

References Cited in the file of this patent

UNITED STATES PATENTS

| | | |
|---|---|---|
| 1,910,940 | Toske | May 23, 1933 |
| 2,475,514 | Plumley | July 5, 1949 |
| 2,669,134 | Toske | Feb. 16, 1954 |